INVENTOR
JOSEPH J. RAMGE

BY

*Olsen and Stephenson*

ATTORNEYS 3,443,481
AUTOMATIC INDEX MECHANISM
Joseph J. Ramge, 1495 Fairholme Road,
Grosse Pointe Woods, Mich. 48236
Filed May 31, 1967, Ser. No. 642,535
Int. Cl. B23f 23/08
U.S. Cl. 90—56    10 Claims

ABSTRACT OF THE DISCLOSURE

Index mechanism which automatically rotates the spindle for a machine tool through a preselected angle without affecting the position of the drive mechanism for the spindle. The mechanism utilizes a single index plate so that it can be used to index tools having various numbers of flutes.

BACKGROUND OF THE INVENTION

The index mechanism of this invention is usable with substantially any machine tool spindle which it is desired to index. It is particularly useful in the work moving machine illustrated in applicant's prior U.S. Patent No. 3,066,456 which is used for accurately moving work along a predetermined path. The work can take the form of end mills, drills, cams, worms and the like which must be precisely moved along a predetermined path relative to a cutter, grinding wheel, polishing wheel and the like during machining of these parts. Prior index mechanisms have used parts which are subject to wear affecting the accuracy of the mechanism or have required the substitution of parts for work having various numbers of flutes.

SUMMARY OF THE INVENTION

This invention utilizes a release cam for moving a drive member through a predetermined index angle. When the index angle movement has been accomplished, the cam is released so that during driving of the workpiece spindle, the came is free. A single index plate having a sufficient number of notches to accommodate a tool with the maximum anticipated number of flutes is driven by a releasable pin through the desired index angle. The pin engagement with the index plate is then utilized for driving of the spindle in-between successive index operations.

It is an object of this invention, therefore, to provide an improved automatic index mechanism which will index a machine tool spindle in any position of the spindle and then free itself from the spindle.

Figure 1:
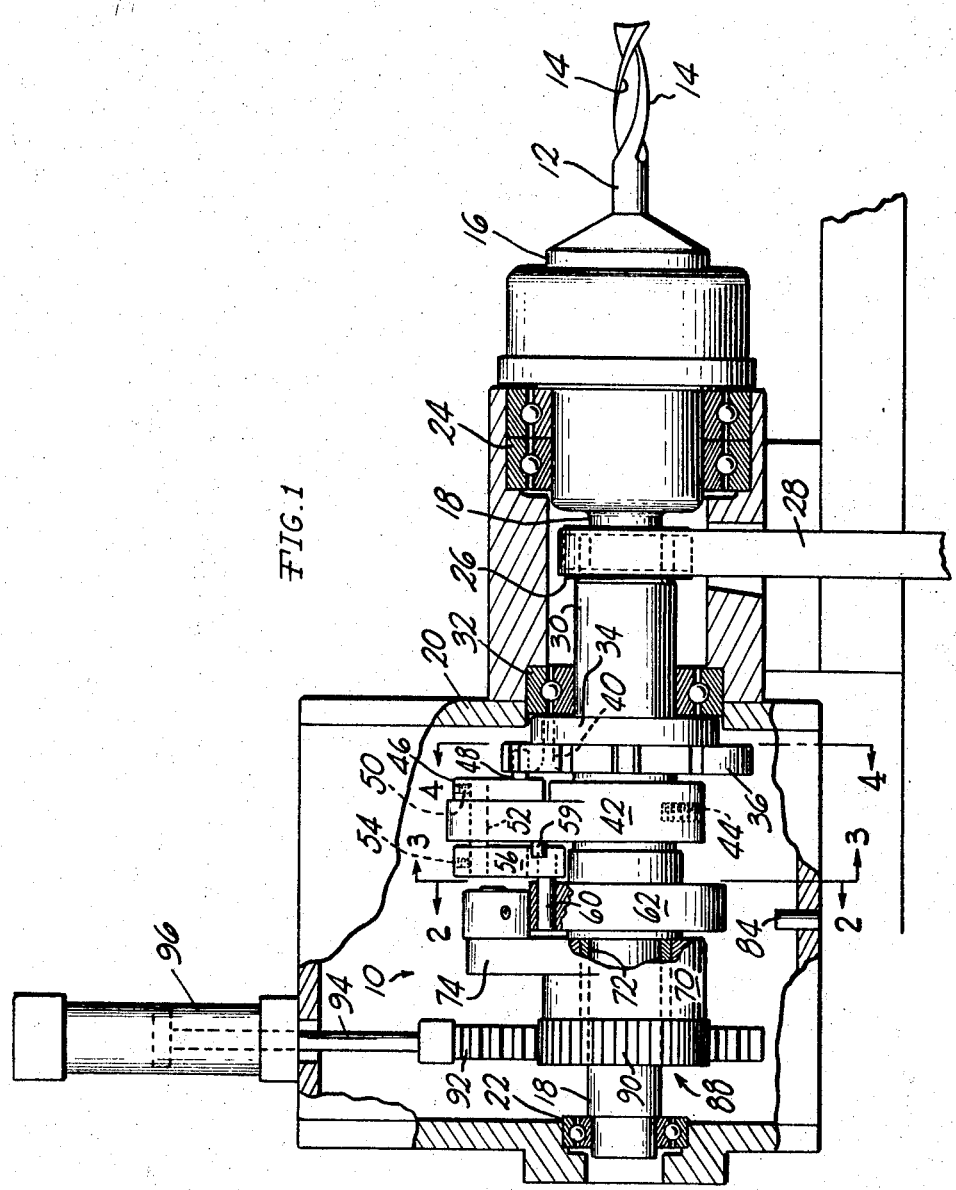
Figure 2:
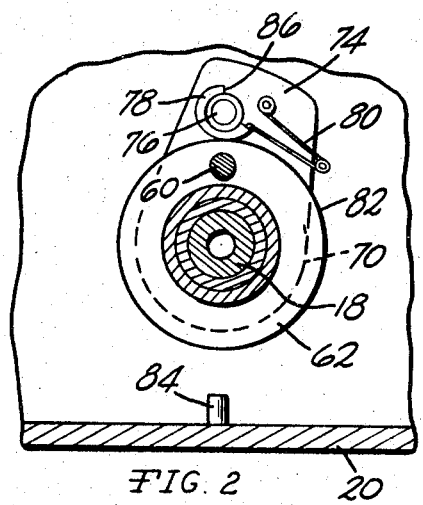
Figure 3:
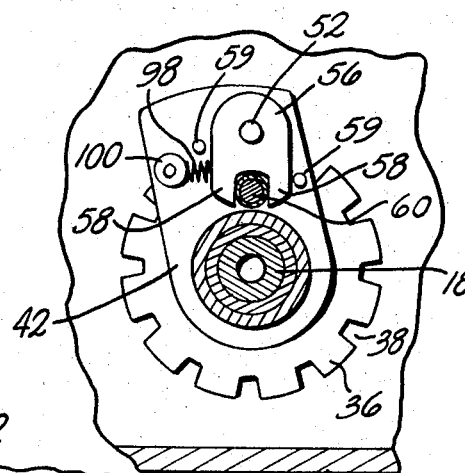
Figure 4:
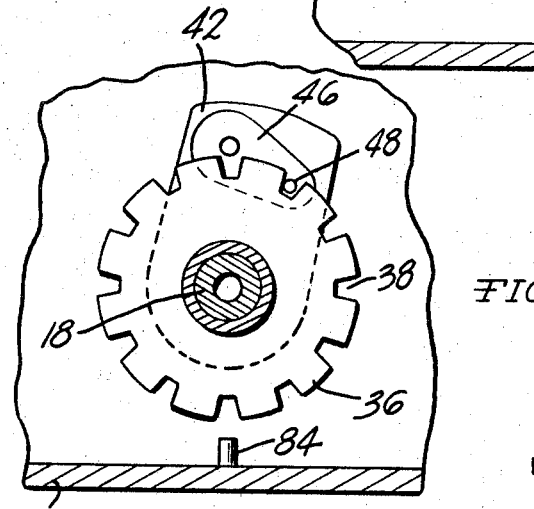

Further objects, features and advantages of this invention will become apparent from a consideration of the following description, the appended claims, and the accompanying drawing in which:

FIGURE 1 is a longitudinal elevational view of a machine tool drive mechanism utilizing the index mechanism of this invention, with some parts broken away and other parts shown in section for the purpose of clarity; and FIGURES 2-4, inclusive, are transverse sectional views of different parts of the mechanism of this invention as seen from substantially the lines 2—2, 3—3 and 4—4, respectively, in FIG. 1.

With reference to the drawing, the index mechanism of this invention, indicated generally at 10, is illustrated in FIG. 1 in assembly relation with the drive for a machine tool 12, illustrated as an end mill, having a plurality of flutes 14 and mounted in a collet 16 so that the tool 12 is driven by a shaft 18. A housing 20 carries bearings 22 and 24 which rotatably support the shaft 18 adjacent its ends. A drive sprocket 26, driven by a belt 28, moves the tool 12 along a predetermined path relative to a cutter, grinding wheel or the like (not shown) for sharpening or forming of the flutes 14 in a manner particularly described in the aforementioned Patent 3,066,456. The pulley 26 is fixedly mounted on a sleeve 30 which is rotatably supported in a bearing 22 which is supported on the housing 20 and is provided with a flange 34. The sleeve 30 and the shaft 18 are rotatable relative to each other, and the sleeve 30 has an integral flange 34 disposed adjacent the bearing 32.

An index plate 36, provided with peripheral notches 38 evenly spaced about the periphery thereof (FIG. 4) is secured, such as by the screw 40, to the flange 34. A body 42, secured to the shaft 18, such as by a set screw 44, carries an index arm 46 on which an index pin 48 is mounted, the pin 48 being located so that it can extend into one of the notches 38. The index arm 46 is secured, such as by a set screw 50, to one end of a shaft 52 which extends through and is rotatably supported in the body 42. The opposite end of the shaft is secured, such as by a set screw 54, to a fork-shape actuator arm 56. The arm 56 has spaced legs 58 disposed on opposite sides of and engaged with a drive pin 60. Thus, on rocking of fork arm 56 the shaft 52 is rotated so as to lift index pin 48 out of a notch 38 or drop it into a notch 38. Stops 59 on body 42 engage fork arm 56 so as to limit the rocking thereof to an extent necessary to move index pin 48 into and out of notches 38. A collar 62, rotatably supported on the shaft 18, carries the drive pin 60 which extends into the space between the legs 58 on the actuator arm 56.

It can thus be seen that when the sprocket 26 is being driven by the belt 28, the sleeve 30 is rotated to in turn rotate the index plate 36. With the index pin 48 in a notch 38, the body 42 is rotated by the index plate 36 to in turn rotate the shaft 18 and thus the machine tool 12.

For indexing the shaft 18, an actuating member 70 is rotatably mounted on a bearing 72 carried by the shaft 18 at a position adjacent the collar 62. The member 70 has an extension 74 which carries a shaft 76 on which a conventional "one-way drive" cam 78 is rotatably mounted. A spring 80 carried by the extension 74 engages the cam 78 so as to continually urge the cam 78 in a clockwise direction about the shaft 76 as viewed in FIG. 2. The pressure of the spring 80 on the cam 78 urges the cam 78 into locking engagement with the outer peripheral surface 82 of the collar 62 on rotation of member 70 in a clockwise direction as viewed in FIG. 2. Rotation of the cam 78 in a counterclockwise direction, as viewed in FIG. 2, about the shaft 76 releases the cam 78 from driving engagement with the collar surface 82. Consequently, on rotation of member 70 in a counterclockwise direction in FIG. 2, the cam 78 rides freely on collar 62 without driving the collar. A pin 84 on the housing 20 is engageable with a radially extending surface 86 on the cam 78 so as to rotate the cam 78 in a releasing direction against the pressure of the spring 80. The cam 78 is of a progressively increasing diameter from surface 86 in a counterclockwise direction in FIG. 2.

In the illustrated embodiment of the invention, the member 70 is driven by a rack and gear assembly indicated generally at 88, but it is to be understood that the body 70 can be rotated by means of any suitable mechanism. The illustrated assembly 88 consists of a gear 90 attached to the member 70 and a rack 92 attached to the piston rod 94 for a fluid actuator cylinder assembly 96 mounted on the housing 20. The rack 92 meshes with the gear 90 for driving the gear 90 in opposite directions.

It can thus be seen that when the member 70 is rotated in a clockwise direction as viewed in FIG. 2 about the shaft 18, the cam 78 will be moved with the body 70. Since the cam 78 is locked to the collar surface 82, the collar 62 will also be rotated in the same direction through an angle dependent upon the starting position of the cam 78 relative to the pin 84. During initial rotation of the collar 62, the actuating arm 56 is rocked in a clockwise direction, as viewed in FIG. 3, by the drive pin 60 so as to rotate the shaft 52 and the index arm 46 enough to lift the pin 48 clear of the index plate notches 38. The arm 56 then engages a stop 59 so as to provide for rotation of body 42 with collar 62 and move the pin 48 to a position opposite another notch 38. During movement of body 42, shaft 18 is being rotated so as to accomplish the desired indexing of tool 14. As soon as the cam 78 engages the pin 84, drive of the collar 62 is discontinued, so that indexing is also discontinued, and a spring 98 (FIG. 3) moves the arm 56 to a position in which the pin 48 falls into this other notch 38. The spring 98 extends between one side of the arm 56 and a fixed abutment 100 mounted on the body 42. When the rack is returned, on a return stroke of the cylinder 96, the spring 90 re-engages the cam 78 with the collar 62 but at such time the member 70 is rotating counterclockwise in FIG. 2 so that the cam 78 merely rides on collar 62 without driving it. The rack 92 is returned to a position in which it is ready for the next indexing movement, the magnitude of which is thus dependent upon the stroke of the cylinder 96 which is readily set and adjusted. It can be seen that during this indexing, the position of the sprocket 26 is not changed so that the work moving mechanism remains in position for subsequent movement of the work.

From the above description it is seen that this invention provides automatic index mechanism for moving a tool 14 mounted on a spindle 18 through a predetermined index angle without affecting the position of the drive 26 for the spindle 18. By leaving the rack 92 in its extended position in which the surface 86 on the cam 78 is engageable with the pin 84, the spindle 18 can be subsequently rotated by the sprocket 26 in both directions without interference from the collar 62 which will merely be rotated around the spindle 18 by the engagement of arm 56 with drive pin 60. If the rack 92 is retracted, so as to allow the spring 80 to return the cam 78 into locking engagement with the collar 62, the spindle 18 can be rotated in only one direction by the sprocket 26. In either event, this invention provides automatic indexing mechanism 10 which is friction free, free of parts whose wear will affect the accuracy of operation, and can be operated by a variety of mechanisms such as the rack and gear mechanism 88 shown in FIG. 1. If desired, the mechanism 10 can be hand operated. It is not necessary to change the index plate 36 in order to index different tools 14 having different numbers of flutes, and in all cases the index pin 48 is self-adjusting in a notch 38.

It will be understood that the automatic index mechanism which is herein disclosed and described is presented for purposes of explanation and illustration and is not intended to indicate limits of the invention, the scope of which is defined by the following claims.

What is claimed is:

1. Index mechanism comprising a rotatable spindle, an actuating body secured to said spindle for rotation therewith, an index plate formed with peripheral notches and rotatably mounted on said spindle on one side of said body, means connected to said index plate for driving said spindle, a drive pin movably mounted on said body at a position to extend into driving engagement with said index plate to provide for concurrent rotation of said body and said index plate, and means for selectively moving said drive pin out of driving engagement with said index plate so that said body can be moved to index said spindle without affecting said spindle driving means.

2. Index mechanism according to claim 1 wherein said last-mentioned means comprises shaft means rotatably supported on said body, an index arm supporting said index pin and secured to said shaft means so that rotation of said shaft means is operable to move said index pin into and out of said index plate notches, and means rotatably supported on said spindle on the opposite side of said body engaged with said shaft means for rotating said shaft means.

3. Index mechanism according to claim 2 wherein said last-mentioned means comprises an actuating arm secured to said shaft means, a collar rotatably supported on said spindle, and an actuating pin carried by said collar and movably engaged with said actuating arm so that rotation of said collar is operable to rotate said actuating arm.

4. Index mechanism according to claim 3 further including stop means on said body engageable with said actuating arm on rotation thereof through an angle sufficient to move said index pin out of said index plate notches to provide for rotation of said body on rotation of said collar.

5. The structure according to claim 4 further including one-way drive means operable on rotation to drive said collar about said spindle.

6. Index mechanism according to claim 5 wherein said one-way drive means includes a member rotatably mounted on said spindle adjacent said collar, and one-way cam on said member engaged with said collar for rotating said collar in response to rotation of said member in one direction.

7. Index mechanism according to claim 6 in which said cam engages the periphery of said collar and further including spring means on said member engaged with said cam and urging said cam against said collar periphery.

8. Index mechanism according to claim 6 further including means engageable with said cam after a predetermined rotation of said collar for moving said cam to release said cam from driving engagement with said collar.

9. Index mechanism according to claim 8 wherein said last-mentioned means is a stationary pin.

10. Index mechanism according to claim 6 further including rack and gear means operatively associated with said member for rotating said member through a predetermined index angle.

References Cited

UNITED STATES PATENTS 2,528,753   11/1950   Jessup               51—216
2,710,498   6/1955    Rocheleau       51—216 X ANDREW R. JUHASZ, *Primary Examiner.*

G. WEIDENFELD, *Assistant Examiner.*

U.S. Cl. X.R.

51—216